(12) United States Patent
Yogo et al.

(10) Patent No.: US 8,452,044 B2
(45) Date of Patent: May 28, 2013

(54) PRINTED MATTER, IMAGE PROCESSING APPARATUS, PRINTED MATTER AUTHENTICITY DETERMINATION APPARATUS, IMAGE PROCESSING METHOD, PRINTED MATTER AUTHENTICITY DETERMINATION METHOD, AND PROGRAM

(75) Inventors: Yoshio Yogo, Iruma-gun (JP); Minoru Ogawa, Hiki-gun (JP); Keisuke Takayama, Misato (JP); Akihiro Fujita, Tokyo (JP); Hiroyuki Iwanaga, Saitama (JP)

(73) Assignee: Toppan Printing Co., Ltd., Tokyo (JP)

( * ) Notice: Subject to any disclaimer, the term of this patent is extended or adjusted under 35 U.S.C. 154(b) by 1136 days.

(21) Appl. No.: 12/310,234

(22) PCT Filed: Aug. 21, 2007

(86) PCT No.: PCT/JP2007/066167
§ 371 (c)(1),
(2), (4) Date: Feb. 18, 2009

(87) PCT Pub. No.: WO2008/023691
PCT Pub. Date: Feb. 28, 2008

(65) Prior Publication Data
US 2010/0021002 A1 Jan. 28, 2010

(30) Foreign Application Priority Data
Aug. 22, 2006 (JP) ................. P2006-225192

(51) Int. Cl.
*G06K 9/00* (2006.01)
*H04N 1/40* (2006.01)

(52) U.S. Cl.
USPC ........................... 382/100; 358/3.28

(58) Field of Classification Search
USPC ........................... 382/100; 358/3.28
See application file for complete search history.

(56) References Cited

U.S. PATENT DOCUMENTS

| | | | | |
|---|---|---|---|---|
| 5,772,248 A * | 6/1998 | Phillips | | 283/91 |
| 5,809,160 A * | 9/1998 | Powell et al. | | 382/100 |
| 6,111,990 A * | 8/2000 | Sugaya et al. | | 382/250 |
| 6,625,295 B1 * | 9/2003 | Wolfgang et al. | | 382/100 |
| 7,277,557 B2 * | 10/2007 | Ihara | | 382/100 |
| 7,840,027 B2 * | 11/2010 | Moroo et al. | | 382/100 |
| 8,107,669 B2 * | 1/2012 | Kim et al. | | 382/100 |
| 2002/0054317 A1 * | 5/2002 | Matsunoshita et al. | | 358/1.14 |
| 2002/0099943 A1 * | 7/2002 | Rodriguez et al. | | 713/176 |

(Continued)

FOREIGN PATENT DOCUMENTS

| CN | 1517231 A | 8/2004 |
|---|---|---|
| JP | 5-139022 | 6/1993 |

(Continued)

OTHER PUBLICATIONS

Translation of JP 2001-213042 A.*

(Continued)

*Primary Examiner* — Michelle Entezari

(57) ABSTRACT

A printed matter, wherein a line latent image and a digital watermark are printed in a predetermined region in an overlapping manner, the line latent image becoming visible when a line filter provided with a line pattern formed on a transparent film is superimposed thereon.

5 Claims, 12 Drawing Sheets

U.S. PATENT DOCUMENTS

| | | | |
|---|---|---|---|
| 2002/0105675 A1* | 8/2002 | Toyofuku | 358/1.15 |
| 2002/0187414 A1* | 12/2002 | Foucher et al. | 430/108.21 |
| 2003/0156733 A1* | 8/2003 | Zeller et al. | 382/100 |
| 2003/0159046 A1 | 8/2003 | Choi et al. | |
| 2004/0148507 A1* | 7/2004 | Iwamura et al. | 713/176 |
| 2004/0213432 A1* | 10/2004 | Kadota | 382/100 |
| 2004/0264811 A1* | 12/2004 | Yano et al. | 382/306 |
| 2005/0185211 A1* | 8/2005 | Foehr et al. | 358/1.15 |
| 2006/0075241 A1* | 4/2006 | Deguillaume et al. | 713/176 |
| 2006/0087672 A1 | 4/2006 | Fujii | |
| 2007/0085898 A1* | 4/2007 | Zaitsevsky | 347/251 |
| 2007/0110317 A1* | 5/2007 | Davis et al. | 382/199 |
| 2007/0263898 A1* | 11/2007 | McCarthy et al. | 382/100 |

FOREIGN PATENT DOCUMENTS

| | | |
|---|---|---|
| JP | 2000-298730 | 10/2000 |
| JP | 2001-213042 | 8/2001 |
| JP | 2002-64700 | 2/2002 |
| JP | 2003-87551 | 3/2003 |
| JP | 2004-174880 | 6/2004 |
| JP | 2004-518321 | 6/2004 |
| JP | 2005-130116 | 5/2005 |
| JP | 2005-222099 | 8/2005 |
| JP | 2006-86766 | 3/2006 |
| JP | 2006-121518 | 5/2006 |
| JP | 2006-166201 | 6/2006 |
| KR | 10-2005-0062092 | 6/2005 |

OTHER PUBLICATIONS

Translation of JP 2004-174880.*
Japanese Office Action issued Apr. 26, 2011 in corresponding Japanese Patent Application 2008-530914.
Korean Office Action issued on Aug. 26, 2010 in corresponding Korean Patent Application 10-2009-7005280.
Chinese Office Action issued Nov. 25, 2010 in corresponding Chinese Patent Application 200780030920.6.
International Search Report for International Application No. PCT/JP2007/066167, mailed Nov. 6, 2007.

* cited by examiner

PRINTED MATTER, IMAGE PROCESSING APPARATUS, PRINTED MATTER AUTHENTICITY DETERMINATION APPARATUS, IMAGE PROCESSING METHOD, PRINTED MATTER AUTHENTICITY DETERMINATION METHOD, AND PROGRAM

CROSS REFERENCE TO RELATED PATENT APPLICATIONS

This application claims the benefit under 35 U.S.C. Section 371, of International Application No. PCT/JP2007/066167, filed Aug. 21, 2007, which claimed priority to Japanese Application No. 2006-225192, filed Aug. 22, 2006 in the Japanese Patent Office, the disclosures of which are hereby incorporated by reference.

TECHNICAL FIELD

The present invention relates to a printed matter, a printed matter manufacturing apparatus, a printed matter authenticity determination apparatus, an image processing method, a printed matter authenticity determination method, and a program, and more particularly to a printed matter, a printed matter manufacturing apparatus, a printed matter authenticity determination apparatus, an image processing method, a printed matter authenticity determination method, and a program that respectively utilizes a line latent image and a digital watermark.

BACKGROUND ART OF THE INVENTION

Conventionally, a method of manufacturing a printed matter for preventing forgery or the like is known where a line latent image is printed that is made visible by being superimposed with a line screen filter where line-like stripes are provided on a transparent film (Patent Document 1 and Patent Document 2).

In addition, a method of preventing duplication or the like of electronic image data is known in which a digital watermark is embedded in the electronic image data (Patent Document 3).

Patent Document 1: Japanese Unexamined Patent Publication, First Publication No. 2004-174880

Patent Document 2: Japanese Unexamined Patent Publication, First Publication No. 2001-213042

Patent Document 3: Japanese Unexamined Patent Publication, First Publication No. 2002-64700

DETAILED DESCRIPTION OF THE INVENTION

Problems to be Solved by the Invention

However, in the technique described in Patent Document 1 and Patent Document 2, it is possible for a printer or others to analyze the pattern of the line latent image printed on a printed matter, to thereby produce a copy of the printed matter with an identical pattern. This poses a problem in that it is not possible to prevent a printer or others from counterfeiting or duplicating a printed matter.

The present invention has been achieved in view of the above circumstances, and has an object to provide: a printed matter effective in prevention or safeguard against forgery or duplication; an image processing apparatus, an image processing method, and a program that are favorable for obtaining the printed matter; and an authenticity determination apparatus and an authenticity determination method that are favorable for determining the authenticity of the printed matter.

Means for Solving the Problem

In order to solve the above-described problem, the present invention employs the following. That is, the present invention employs a printed matter, wherein a line latent image and a digital watermark are printed in a predetermined region in an overlapping manner, the line latent image becoming visible when a line filter provided with a line pattern formed on a transparent film is superimposed thereon.

According to the above printed matter, it is possible to determine whether the printed document is genuine or counterfeit based not only on the determination of whether the latent image is detectable from the line latent image or not, but also on the determination of whether the digital watermark is detectable from the electronic image data that is generated by reading the printed matter with a scanner or the like or not. As a result, it is possible to obtain an advantage of providing more secure prevention or more secure safeguard against forgery and duplication of the printed matter.

In addition, an image processing apparatus of the present invention includes: a latent image generation device that generates electronic image data of a line latent image, the line latent image becoming visible when a line filter provided with a line pattern formed on a transparent film is superimposed thereon; a digital watermark generation device that generates electronic image data of a digital watermark and; an image merging device that merges, in a predetermined region, electronic image data of the line latent image generated by the latent image generation device with the electronic image data generated by the digital watermark to generate merged electronic image data.

According to the above image processing apparatus, it is possible to easily obtain the printed matter according to the present invention.

Furthermore, a printed matter authenticity determination apparatus of the present invention includes: an image reading device that reads a printed matter to generate electronic image data; a latent image storage device that stores a latent image embedded in the printed matter; a line filter storage device that stores electronic image data of a line filter provided with a line pattern; a digital watermark storage device that stores a digital watermark embedded in the printed matter; a latent image detection device that causes electronic image data of the line filter stored in the line filter storage device to overlap the electronic image data generated by the image reading device, to thereby determine whether the latent image stored in the latent image storage device is detectable or not; a digital watermark detection device that determines whether the digital watermark stored in the digital watermark storage device is detectable from the electronic image data generated by the image reading device or not; and an authenticity determination device that determines that the printed matter is genuine, if the latent image detection device detects the latent image and if the digital watermark detection device detects the digital watermark.

According to the above printed matter authenticity determination apparatus, it is possible to easily determine the authenticity of the printed matter according to the present invention.

Meanwhile, an image processing method of the present invention includes: a first step of generating electronic image data of a line latent image, the line latent image becoming visible when a line filter provided with a line pattern formed on a transparent film is superimposed thereon; a second step of generating electronic image data of digital watermarks;

and a third step of causing electronic image data of the line latent image generated in the first step to overlap, in a predetermined region, the electronic image data generated in the second step, to thereby generate merged electronic image data.

It may be arranged such that an embedding intensity of the digital watermarks is set so that: the number of detections of the digital watermarks embedded in the printed matter is not less than a predetermined number; and a difference between the number of detections of the digital watermarks in an original and the number of detections of the digital watermarks in a copy of the printed matter is not less than a predetermined value.

It may be arranged such that the electronic image data of the line latent image is in a vector image format; the electronic image data of the digital watermarks is in a bitmap image format; and in the third step, the electronic image data of the line latent image is transformed from a vector image format into a bitmap image format, and then is superimposed on the electronic image data of the digital watermarks, to thereby generate the merged electronic image data.

It may be arranged such that the electronic image data of the line latent image is in a vector image format; the electronic image data of the digital watermarks is in a bitmap image format; and in the third step, the electronic image data of the digital watermarks is transformed from a bitmap image format into a vector image format, and then is superimposed on the electronic image data of the line latent image, to thereby generate the merged electronic image data.

According to the above image processing method, it is possible to obtain an advantage similar to that of the above image processing apparatus.

In addition, a printed matter authenticity determination method of the present invention includes: a first step of reading a printed matter to generate electronic image data; a second step of storing a latent image embedded in the printed matter; a third step of storing electronic image data of a line filter provided with a line pattern; a fourth step of storing the digital watermark embedded in the printed matter; a fifth step of superimposing the electronic image data of the line filter stored in the third step on the electronic image data generated in the first step, to thereby determine whether the latent image stored in the second step is detectable or not; a sixth step of determining whether the digital watermark stored in the fourth step is detectable from the electronic image data generated in the first step or not; and a seventh step of determining the printed matter as genuine, if the latent image is detected in the fifth step, and if the digital watermark is detected in the sixth step.

According to the above printed matter authenticity determination method, it is possible to obtain an advantage similar to that of the above printed matter authenticity determination apparatus.

Furthermore, a program of the present invention allows a computer to execute: latent image generation processing that generates electronic image data of a line latent image, the line latent image becoming visible when a line filter provided with a line pattern formed on a transparent film is superimposed thereon; digital watermark generation processing that generates electronic image data of a digital watermark; and image merging processing that causes the electronic image data of the line latent image generated in the latent image generation processing to overlap, in a predetermined region, the electronic image data of the digital watermark generated in the digital watermark generation processing, to thereby generate merged electronic image data.

According to the above program, it is possible to easily obtain the printed matter according to the present invention.

Advantageous Effects of the Invention

The present invention provides a printed matter, in which a line latent image and a digital watermark are printed in a predetermined region in an overlapping manner, the line latent image becoming visible when a line filter provided with a line pattern formed on a transparent film is superimposed thereon. According to this, it is possible to determine whether the printed matter is genuine or counterfeit based not only on the determination of whether the latent image is detectable from the line latent image or not, but also on the determination of whether the digital watermark is detectable from the electronic image data that is generated by reading the printed matter with a scanner or the like or not. As a result, it is possible to obtain an advantage of providing more secure prevention of or more secure safeguard against forgery and duplication of the printed matter.

In addition, the present invention provides an image processing apparatus, an image processing method, and a program that are favorable for obtaining the printed matter. With these, it is possible to easily obtain the printed matter according to the present invention.

Furthermore, the present invention provides an authenticity determination apparatus favorable for the authenticity determination of the printed matter. With this, it is possible to easily determine the authenticity of the printed matter according to the present invention.

DESCRIPTION OF THE REFERENCE SYMBOLS

Figure 1A:
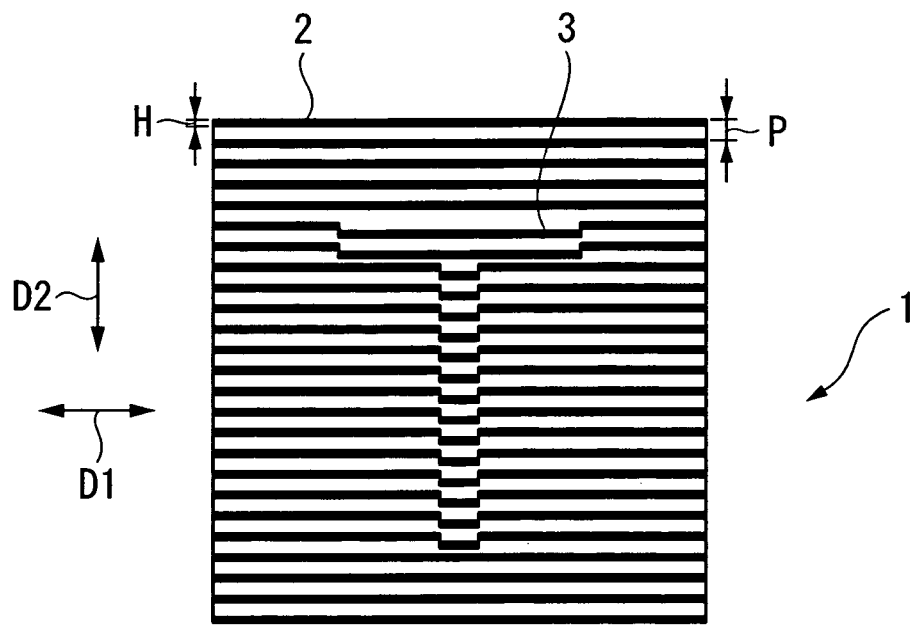
FIG. 1A is a plan view showing a configuration of a printed matter 1 according to an embodiment of the present invention.

10a: image processing apparatus
10b: image processing apparatus
11: latent image generation section
12: bitmap image generation section
13: bitmap image processing section
14: image merging section
15: printing section
21: latent image generation section
22: latent image processing section
23: bitmap image generation section
24: image merging section
25: printing section
30: printed matter authenticity determination apparatus
31: image reading section
32: storage section
33: latent image detection section
34: digital watermark detection section
35: authenticity determination section
36: display section Best Mode for Carrying Out the Invention Hereunder is a description of an embodiment of the present invention with reference to the drawings.

FIG. 1A is a plan view showing one example of a printed matter 1 according to an embodiment of the present invention. On the printed matter 1, a plurality of lines 2 parallel to a horizontal direction D1 are printed in an evenly spaced manner. A width (=H) of the line 2 is equal to a space (=P−H) between the lines 2. Around a center of the printed matter 1, lines 3 are printed that are displaced in a vertical direction D2 from the surrounding lines 2 by a predetermined length.

A width of the line 3 and a space between the lines 3 are equal to the width (=H) of the line 2 and the space (=P−H) between the lines 2, respectively. Here, P represents a pitch between the lines.

Here, the lines 3 form a line latent image in a shape of "T." Furthermore, the lines 2 are printed on the printed matter 1 so as to satisfy the conditions of 50 µm≦P≦300 µm, (¼)× P≦H≦(¾)×P.

Figure 1B:
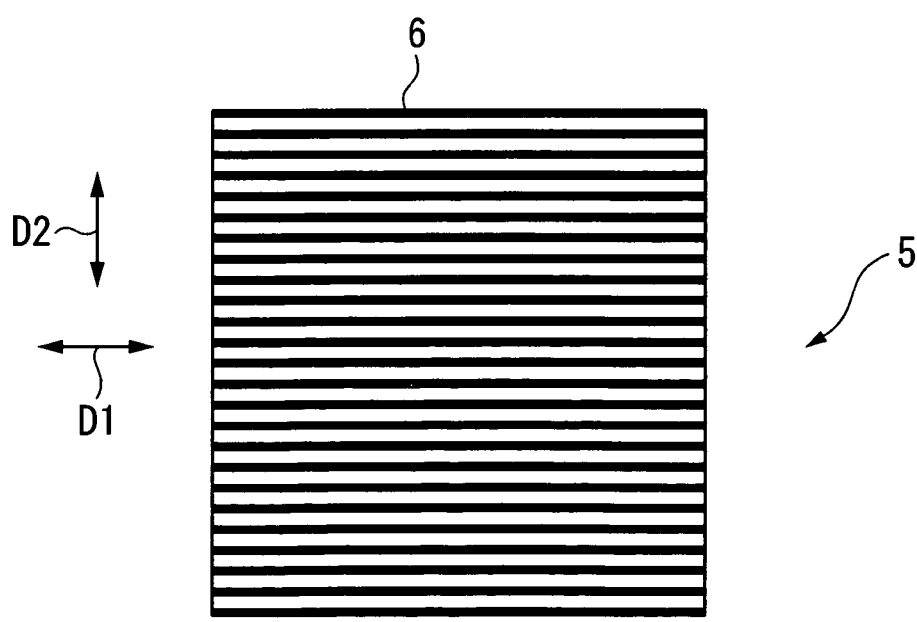
FIG. 1B is a plan view showing a configuration of a line filter 5 according to the embodiment of the present invention.

FIG. 1B is a plan view showing one example of a line filter 5 according to the embodiment of the present invention. In the line filter 5, a plurality of lines 6 parallel to the horizontal direction D1 are printed on a transparent film. The width of the line 6 and a space between the lines 6 are equal to the width (=H) of the line 2 (FIG. 1A) and the space (=P−H) between the lines 2, respectively.

Figure 2A:
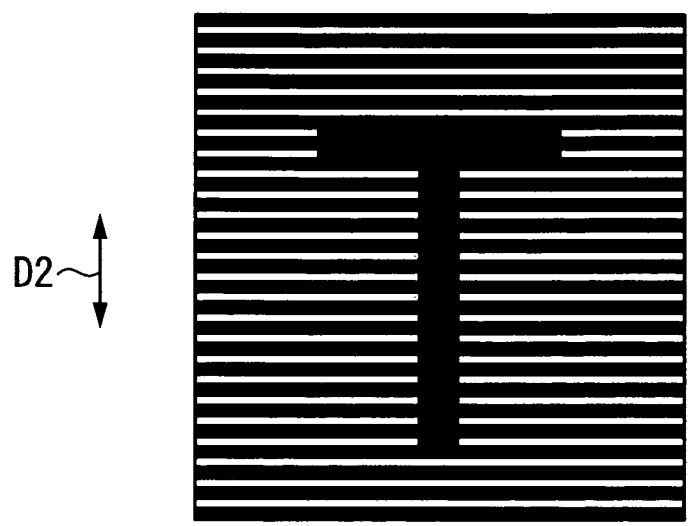
FIG. 2A is a plan view showing a pattern as seen by an observer when the line filter 5 (FIG. 1B) is superimposed on the printed matter 1 (FIG. 1A).
Figure 2B:
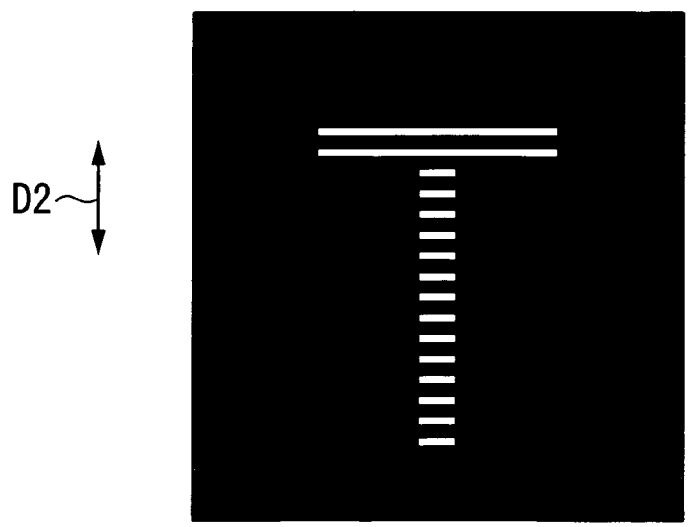
FIG. 2B is a plan view showing a pattern as seen by an observer when the line filter 5 (FIG. 1B) is superimposed on the printed matter 1 (FIG. 1A).

FIG. 2A and FIG. 2B are plan views showing patterns as seen by an observer when the line filter 5 (FIG. B) is superimposed on the printed matter 1 (FIG. 1A). As shown in FIG. 2A and FIG. 2B, the observer visually recognizes the letter "T," which is a latent image. By moving the line filter 5 in a vertical direction D2 on the printed matter 1, the observer visually recognizes the pattern shown in FIG. 2A and the pattern shown in FIG. 2B alternately.

Figure 3A:
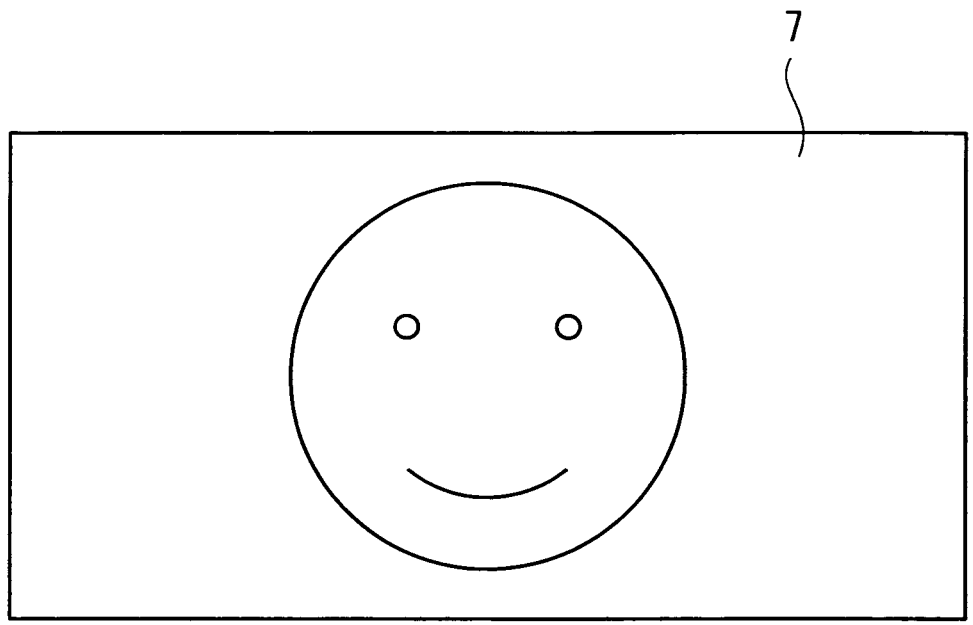
FIG. 3A shows one example of a digital image 7 to be printed on the printed matter 1 according to the embodiment.
Figure 3B:
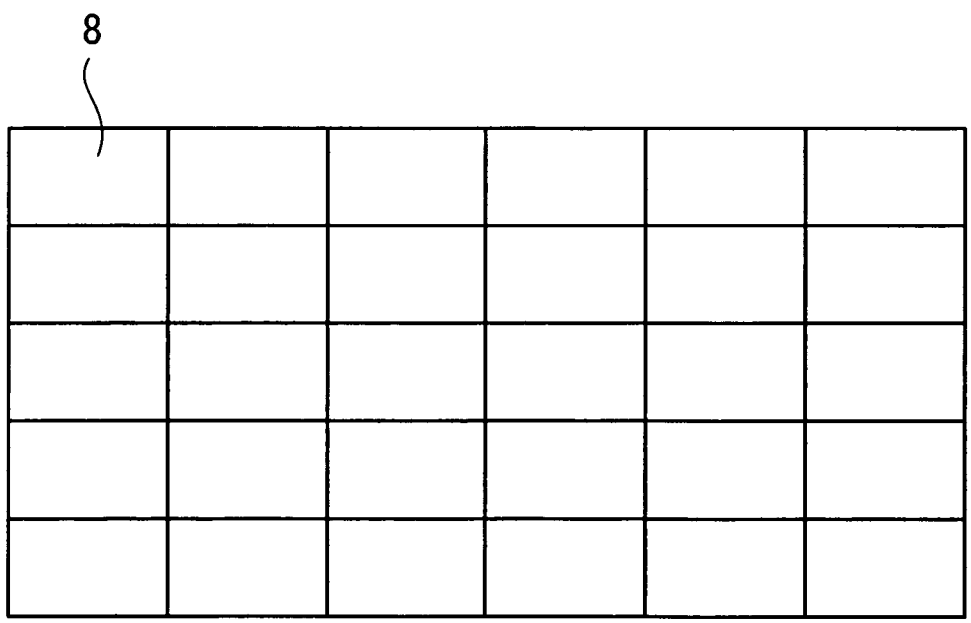
FIG. 3B shows one example of a region division when digital watermarks are embedded in the digital image 7 of FIG. 3A.

FIG. 3A shows one example of a digital image 7 printed on the printed matter 1 according to the embodiment of the present invention. A region in which the digital image 7 is printed is divided into a plurality of blocks 8 (for example, blocks in five columns and six rows). In each block, the same digital (electronic) watermark is embedded. Even if the digital watermarks as shown in FIG. 3B are embedded in the digital image 7, it is not possible for the observer to visually recognize the digital watermarks. The digital watermarks are printed on the printed matter 1 with a predetermined embedding intensity. Note that the digital watermark of the present embodiment includes not only one which is embedded in electronic image data, but also one in which the electronic image data is printed on a printed matter. A printed matter is read with a scanner to generate electronic image data. The digital watermarks printed on the printed matter are utilized for determining whether the digital watermarks are detectable from the electronic image data or not. As a technique related to these digital watermarks, a technique described in Japanese Unexamined Patent Publication, First Publication No. 2002-64700 or the like is known.

On the printed matter 1 of the present embodiment, the digital image 7 in which the digital watermarks as described in FIG. 3A and FIG. 3B, and the line latent image as described in FIG. 1A are printed.

Figure 4:
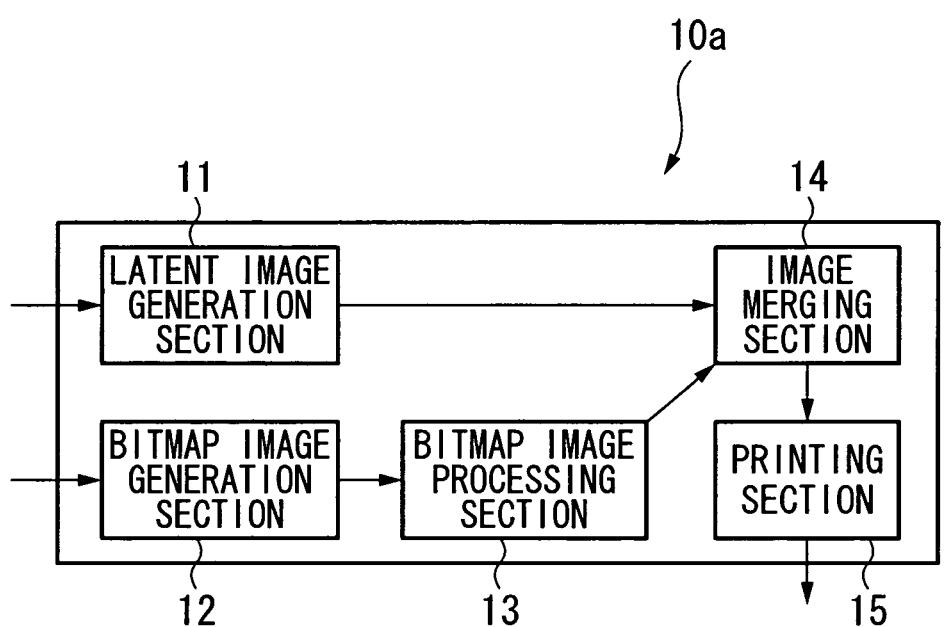
FIG. 4 is a block diagram showing one example of a configuration of an image processing apparatus 10a according to the embodiment.

FIG. 4 is a block diagram showing one example of a configuration of an image processing apparatus 10a according to the embodiment of the present invention. The image processing apparatus 10a includes: a latent image generation section 11; a bitmap image generation section 12; a bitmap image processing section 13; an image merging section 14; and a printing section 15.

The latent image generation section 11 generates electronic image data of a line latent image provided with the latent image as shown in FIG. 1A, and outputs the electronic image data to the image merging section 14. Here, the latent image generation section 11 generates electronic image data of a line latent image in a vector image format. A vector image is an image represented by dots, lines, or the like specified by coordinate values. It is basically a binary image.

The bitmap image generation section 12 generates a digital image such as shown in FIG. 3A, and outputs the digital image to the bitmap image processing section 13. Here, the bitmap image generation section 12 generates a digital image in a bitmap image format. A bitmap image is an image represented with various shades of gray such as 256 shades of gray, and has a color in every pixel.

The bitmap image processing section 13 generates the digital watermarks described for FIG. 3B. Here, the bitmap image processing section 13 generates digital watermarks in a bitmap image format. Furthermore, the bitmap image processing section 13 generates data of an electronic image in which the digital watermarks are embedded in a digital image, the electronic image being a bitmap image with 256 shades of gray. After transforming the bitmap image with 256 shades of gray into a bitmap image with two shades of gray, the bitmap image processing section 13 transforms the bitmap image into a vector image, and outputs it to the image merging section 14.

The image merging section 14 merges, in a predetermined region, the electronic image data generated by the latent image generation section 11 with the electronic image data generated by the bitmap image processing section 13, to thereby generate a single piece of merged electronic image data, which is in a vector image format, and output the merged electronic image data to the printing section 15.

The printing section 15 prints the merged electronic image data generated by the image merging section 14 on a printed matter. As a result, the line latent image (FIG. 1A) and the digital watermarks (FIG. 3B) are printed on the printed matter in an overlapping manner.

As the printing section 15, an offset printing machine or the like may be used. In this case, the merged electronic image data generated by the image merging section 14 is fabricated into a printing plate, which is attached to the offset printing machine. Then, the same printed matters are printed in large quantity. As a result, it is possible to take counterfeit prevention measures and authenticity determination measures in a large quantity of printed matters.

Figure 5:
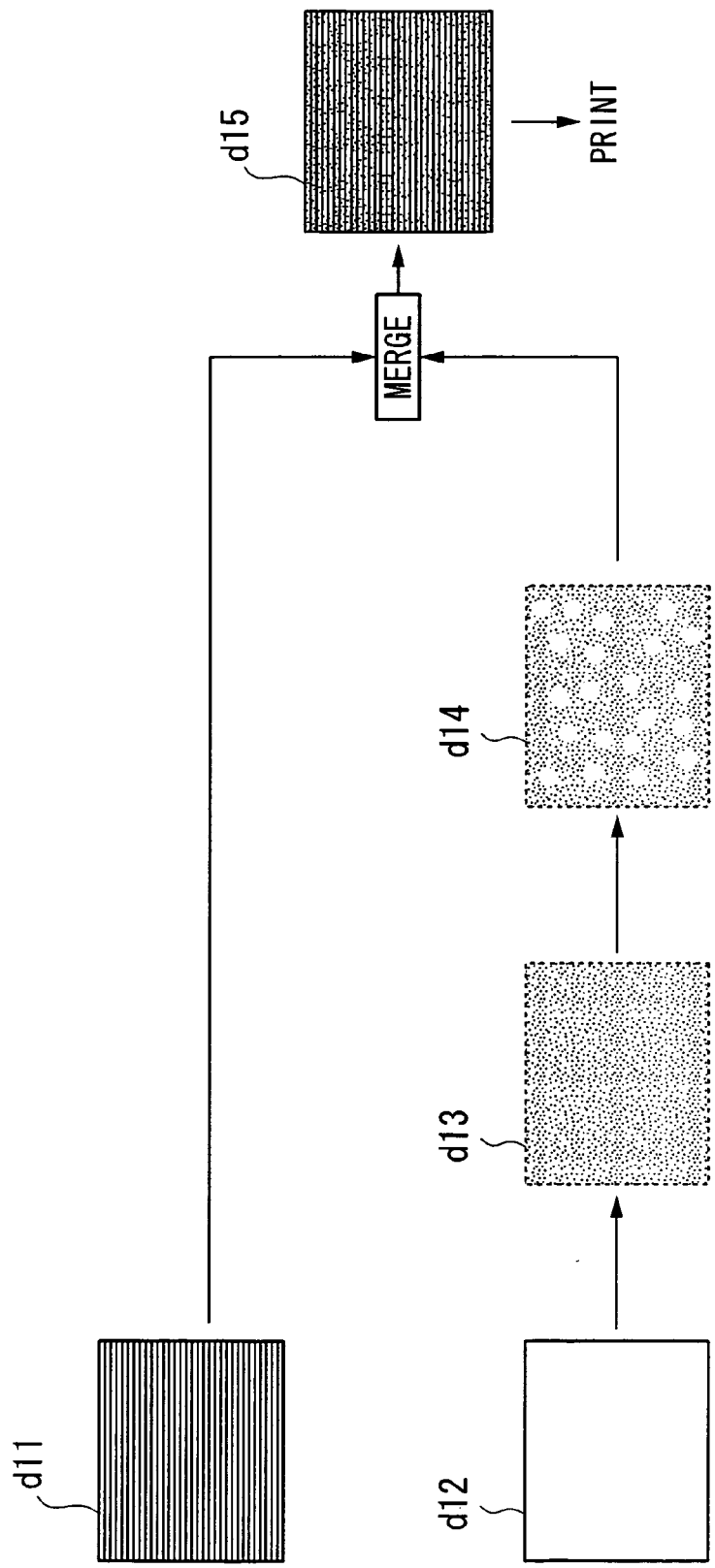
FIG. 5 shows one example of processing of the image processing apparatus 10a (FIG. 4) according to the embodiment. In this figure, d11 denotes a latent image (vector image), d12 denotes a bitmap image, d13 denotes a digital watermark component (256 shades of gray), d14 denotes a digital watermark component (two shades of gray), and d15 denotes a latent image (vector image in which the digital watermark is embedded).

FIG. 5 shows one example of processing of the image processing apparatus 10a (FIG. 4) according to the embodiment of the present invention. First, the latent image generation section 11 generates a latent image d11 in a vector image format. Furthermore, the bitmap image generation section 12 generates a digital image d12 in a bitmap image format.

The bitmap image processing section 13 generates a digital watermark which is a bitmap image d13 with 256 shades of gray. Then, after the digital watermark, which is a bitmap image d13 with 256 shades of gray, is embedded in a bitmap image d12, the bitmap image processing section 13 transforms the bitmap image with 256 shades of gray into a bitmap image d14 with two shades of gray. The bitmap image processing section 13 then transforms the bitmap image d14 into a vector image.

The image merging section 14 merges, in a predetermined region, the latent image in a vector image format that is output from the latent image generation section 11 with the digital image in a vector image format output from the bitmap image processing section 13, to which the digital watermark is embedded. Thereby, the image merging section 14 generates a latent image d15 in a vector image format in which the digital watermark is embedded. Then, the printing section 15 prints the latent image d15 that is output from the image merging section 14 on a printed matter.

According to the aforementioned image processing apparatus 10a, the lines included in the latent image are a vector image. Therefore, when the digital watermark is embedded in the latent image, it is possible to prevent the deterioration of the lines, and to enhance the accuracy with which the line latent image is detected.

Figure 6:
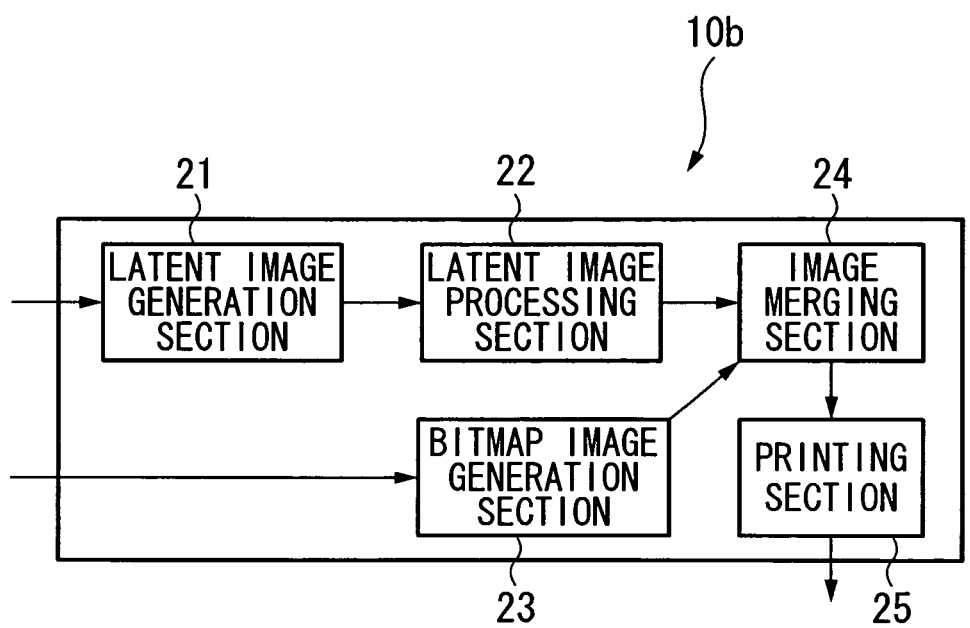
FIG. 6 is a block diagram showing another example of a configuration of the image processing apparatus 10b according to the embodiment.

FIG. 6 is a block diagram showing another example of a configuration of an image processing apparatus 10b according to the embodiment of the present invention. The image processing apparatus 10b includes: a latent image generation section 21; a latent image processing section 22; a bitmap image generation section 23; an image merging section 24; and a printing section 25.

The latent image generation section 21 generates electronic image data of a line latent image provided with the latent image as shown in FIG. 1A, and outputs the electronic image data to the latent image processing section 22. Here, the latent image generation section 21 generates electronic image data of a line latent image in a vector image format.

The bitmap image generation section 23 generates a digital image such as shown in FIG. 3A, and outputs the digital image to the image merging section 24. Here, the bitmap image generation section 23 generates a digital image in a bitmap image format.

The latent image processing section 22 generates the digital watermarks described for FIG. 3B. Here, the latent image processing section 22 generates digital watermarks in a bitmap image format. Furthermore, the latent image processing section 22 generates data of an electronic image where the digital watermarks are embedded in a latent image, the electronic image being a bitmap image with 256 shades of gray. After transforming the bitmap image with 256 shades of gray into a bitmap image with two shades of gray, the latent image processing section 22 outputs it to the image merging section 24.

The image merging section 24 merges the electronic image data generated by the latent image processing section 22 with the electronic image data generated by the bitmap image generation section 23, to thereby generate a single piece of merged electronic image data, which is a bitmap image, and output the merged electronic image data to the printing section 25.

The printing section 25 prints the merged electronic image data generated by the image merging section 24 on a printed matter. As a result, the line latent image (FIG. 1A) and the digital watermarks (FIG. 3B) are printed on the printed matter in an overlapping manner.

Figure 7:
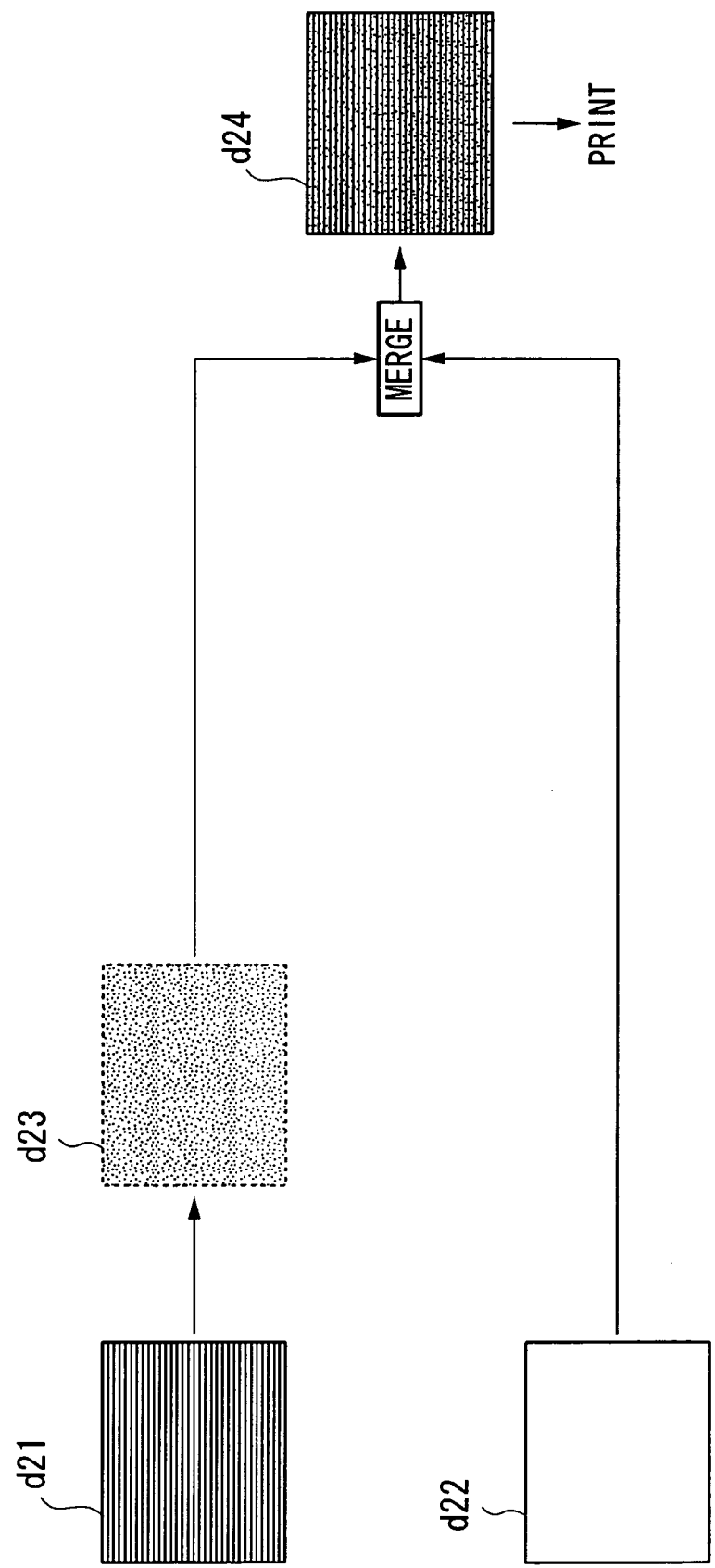
FIG. 7 shows one example of processing of the image processing apparatus 10b (FIG. 6) according to the embodiment. In this figure, d21 denotes a latent image (vector image), d22 denotes a bitmap image, d23 denotes a digital watermark component (256 shades of gray), and d24 denotes a latent image (bitmap image in which the digital watermark is embedded).

FIG. 7 shows one example of processing of the image processing apparatus 10b (FIG. 6) according to the embodiment of the present invention. First, the latent image generation section 21 generates a latent image d21 in a vector image format. Furthermore, the bitmap image generation section 23 generates a digital image d22 in a bitmap image format.

The latent image processing section 22 transforms the vector image of the latent image into a bitmap image. Subsequently, the latent image processing section 22 generates a digital watermark which is a bitmap image d23 with 256 shades of gray. The latent image processing section 22 then embeds the digital watermark, which is a bitmap image d23 with 256 shades of gray, in the latent image d21.

The image merging section 24 merges, in a predetermined region, the latent image in a bitmap image format, in which the digital watermark that is output from the latent image processing section 22 is embedded, with the digital image in a bitmap image format that is output from the bitmap image generation section 23, to thereby generate a latent image d24 in a bitmap image format in which the digital watermark is embedded. Then, the printing section 25 prints the latent image d24 that is output from the image merging section 24 on a printed matter.

According to the aforementioned image processing apparatus 10b, the digital watermark is a bitmap image with 256 shades of gray. Therefore, when the digital watermark is embedded in the latent image, it is possible to prevent the deterioration of the digital watermark, and to enhance the accuracy with which the digital watermark is detected.

Next is a description of a method of embedding a digital watermark in a latent image in the present embodiment.

Figure 8:
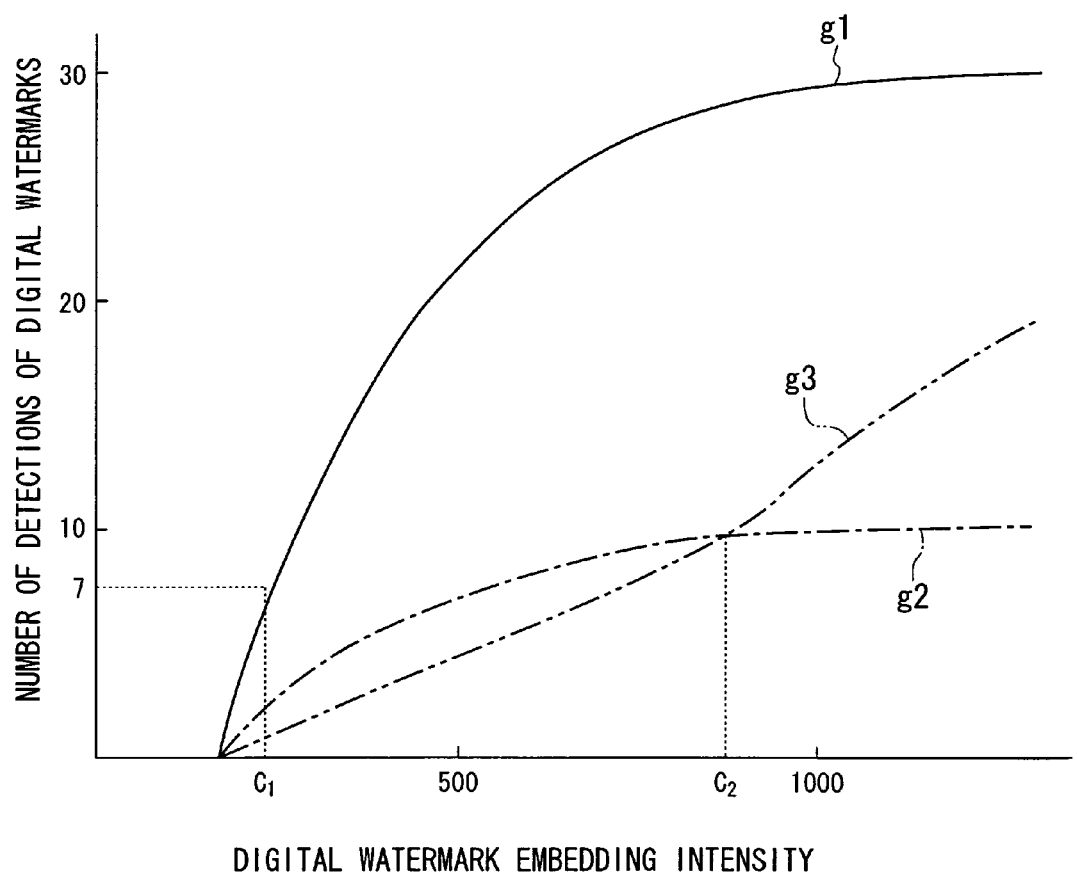
FIG. 8 is a diagram for explaining a method of determining an embedding intensity of a digital watermark in a latent image.

FIG. 8 is a diagram for describing a method of determining a digital watermark embedding intensity in a latent image. The horizontal axis of FIG. 8 represents a digital watermark embedding intensity, while the vertical axis thereof represents the number of detections of digital watermarks. The digital watermark embedding intensity refers to a concentration of ink when digital watermarks are printed on a printed matter. The number of detections of digital watermarks refers to the number of blocks in which the digital watermark is detectable from among all the blocks on a printed matter when scanned with a scanner, in the case where the printed matter is divided into a predetermined number of blocks as shown in FIG. 3B, and the digital watermark is embedded in the blocks. When a large quantity of sheets of paper are printed, an irregularity occurs in the degree of deposition of ink for every sheet of paper even if the same printing plate is used. Accordingly, an irregularity also occurs in a detection result by the scan for every sheet of printed matters 1. When threshold values for discriminating the original from the copy are set, appropriate values are selected in consideration of this problem.

In FIG. 8, a curve g1 represents a case where digital watermarks are detected from the original of the printed matter. A curve g2 represents a case where digital watermarks are detected from a printed matter whose degree of deterioration is 40% of the original. A curve g3 represents a case where digital watermarks are detected from the copy of the printed matter.

In the present embodiment, the digital watermark embedding intensity of the curve g1 at which the number of detection of digital watermarks is equal to or higher than a predetermined value (seven, for example) is set as a threshold value c1. The digital watermark embedding intensity at which the number of detections of digital watermarks of the curve g3 is not above the curve g2 is set as a threshold value c2. The digital watermark embedding intensity is determined so as to be not less than the threshold value c1 and not more than the threshold value c2.

In this manner, with the determination of the digital watermark embedding intensity so that the number of detections of digital watermarks is not less than a predetermined value, it is possible to prevent the digital watermark from being printed on a printed matter such that the number of digital watermarks is smaller than the predetermined value. Furthermore, the determination of the digital watermark embedding intensity so as to satisfy the condition that the number of detections of digital watermarks of the curve g3 is not above the curve g2 makes it possible to make the number of detections of digital watermarks in the original of the printed matter different from the number of detections of digital watermarks in a copy of the printed matter by not less than a predetermined number. Therefore, it is possible to clearly distinguish the original from the copy of a printed matter by means of the digital watermark.

Figure 9:
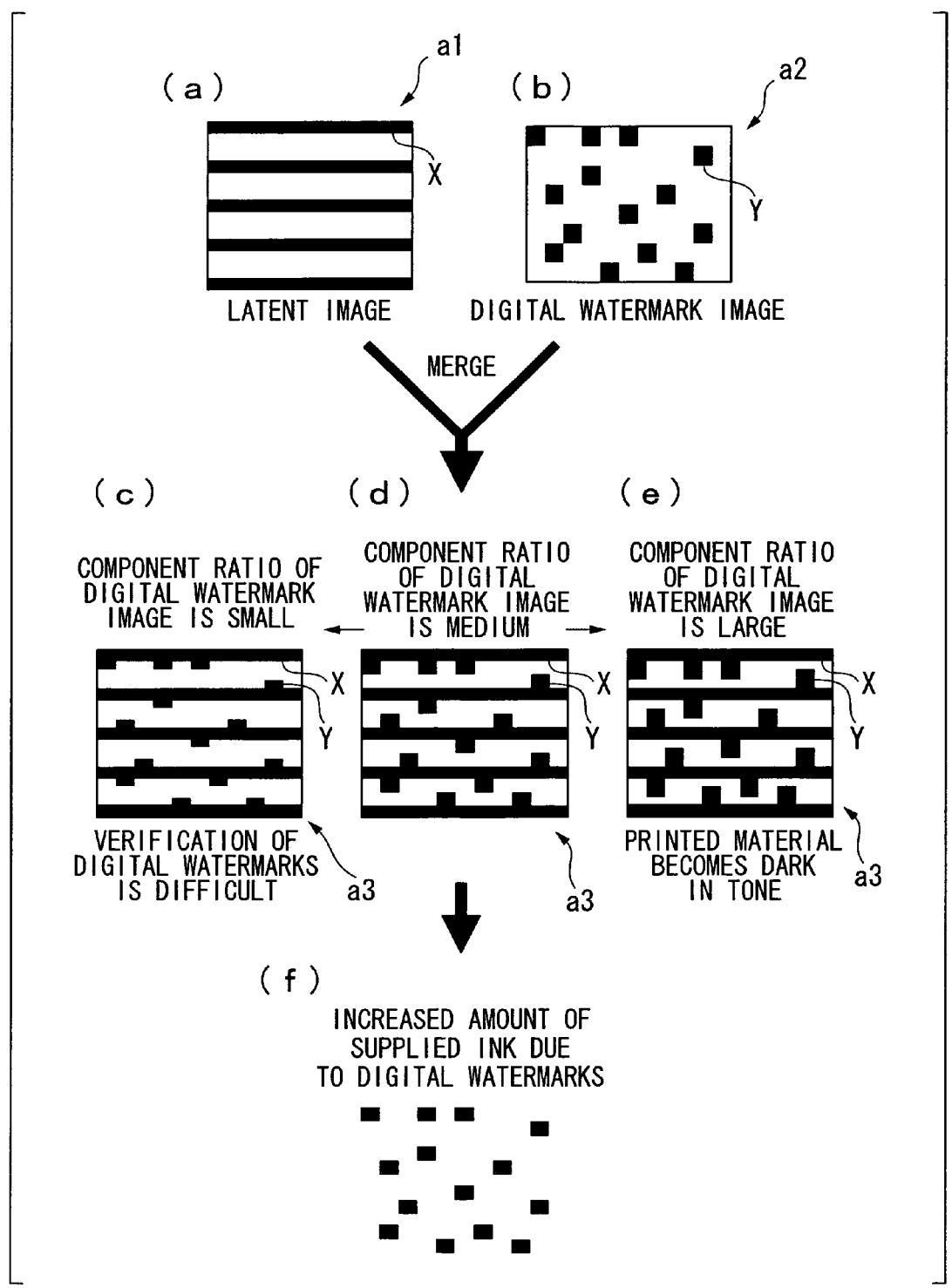
FIG. 9 is diagram for explaining a method of embedding digital watermarks in a latent image.

FIG. 9 is diagrams for explaining a method of embedding digital watermarks in a latent image.

(a) in FIG. 9 shows a region a1 in which a line latent image (latent image) is printed. In the region a1, a plurality of stripe-like lines X are arranged. Here, the description is for the case where the ratio of the area of the region in which the lines X are printed to the area of the region a1 in which the line latent image is printed is 55%, by way of example.

(b) in FIG. 9 shows a region a2 in which a digital watermark is printed. In the region a2, a plurality of rectangular digital watermarks Y are arranged in a dotted manner. Here, the description is for the case where the ratio of the area in which the digital watermarks Y are printed to the area of the region a2 in which the digital watermarks are printed is 40%, by way of example.

(c) to (e) in FIG. 9 show the case where a region a1 in which the line latent image is printed and a region a2 in which the digital watermarks are printed are printed in a region a3 in an overlapping manner. Here, "overlap" refers to the case where the region a2 is included in a part of the region a1, or the case where the region a1 is included in a part of the region a2. While the case where the region a1 and the region a2 are overlapped has been described here, the line latent images X and the digital watermarks Y may be superimposed and printed.

If the superimposed area between the line latent images X and the digital watermarks Y is large as shown at (c) in FIG. 9, it becomes difficult to detect the digital watermarks Y. On the other hand, if the superimposed area between the line latent images X and the digital watermarks Y is small as shown in at (e) in FIG. 9, the printed matter comes to have a large area on which ink is deposited. This impairs the appearance of the printed matter.

Therefore, in the present embodiment, the region a1 in which the line latent image is printed and the region a2 in which the digital watermarks are printed are superimposed so as to make the superimposed area between the line latent images X and the digital watermarks Y smaller than a predetermined value. Furthermore, in the present embodiment, the region a1 in which the line latent image is printed and the region a2 in which the digital watermarks are printed are superimposed ((d) in FIG. 9) so that the increment ((f) in FIG. 9) of the area in which the line latent images X and the digital watermarks Y are printed with respect to the area in which the line latent images X are printed is less than a predetermined ratio (5%, for example).

Next is a description of one example of processing of a printed matter authenticity determination method according to the embodiment of the present invention.

Figure 10:
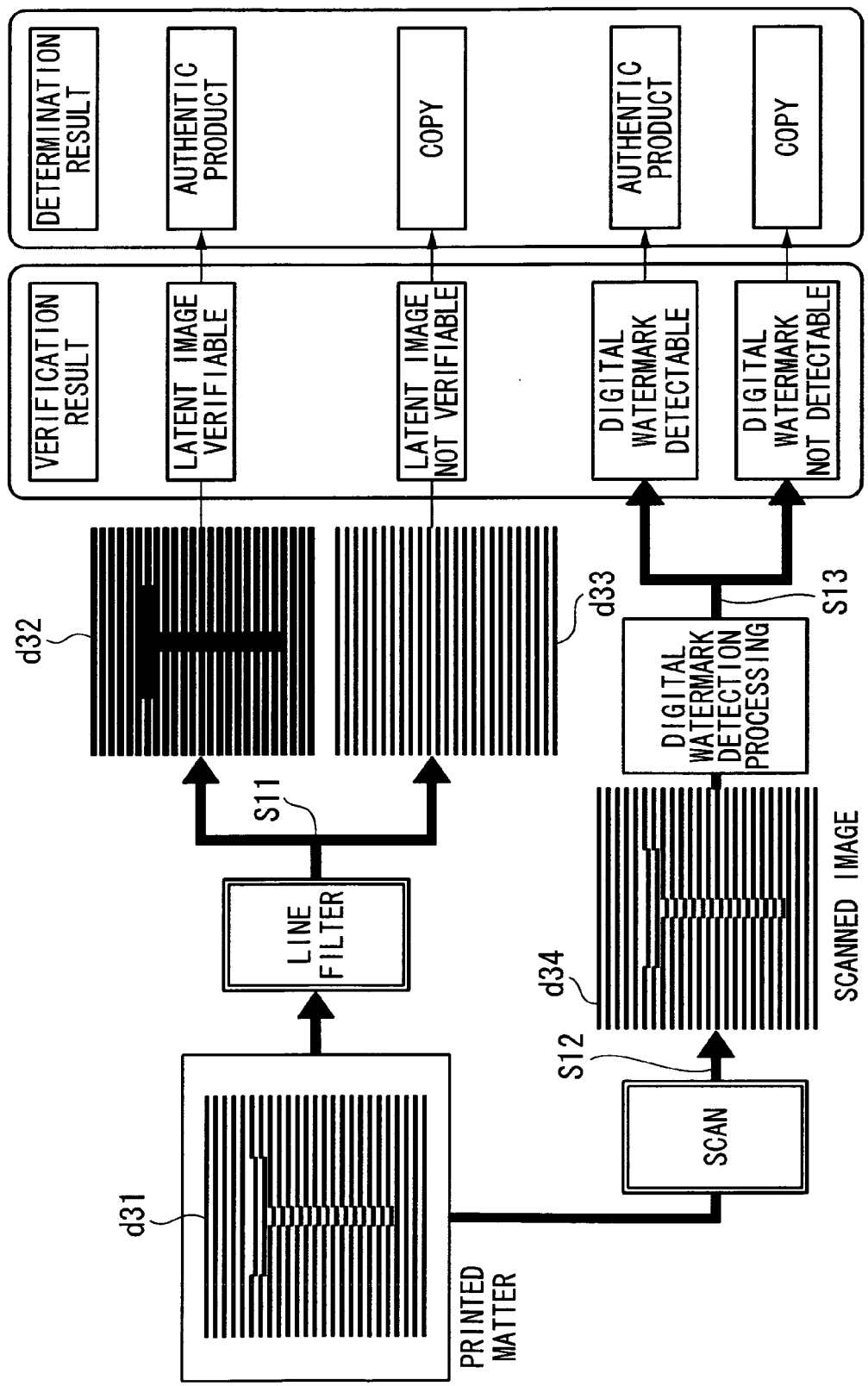
FIG. 10 shows one example of processing of an authenticity determination method of the printed matter according to the embodiment.

FIG. 10 shows one example of processing of the authenticity determination method according to the embodiment of the present invention. First, the line filter shown in FIG. 1B is overlapped with the printed matter d31 shown in FIG. 1A, to thereby determine whether the latent image embedded in the printed matter is verifiable or not (step S11). If the latent image is verifiable in step S11 (d32), the printed matter is determined to be genuine (an authentic product) in the determination using the latent image. On the other hand, if the latent image is not verifiable in step S11 (d33), the printed matter is determined to be counterfeit (a copy) in the determination using the latent image.

Furthermore, the printed matter d31 shown in FIG. 1A is read with a scanner to obtain a scanned image d34 (step S12), and it is determined whether the digital watermarks are detectable from the scanned image d34 or not (step S13). If the digital watermarks are detectable from the scanned image d34 in step S13, the printed matter is determined to be genuine (an authentic product) in the determination using the digital watermark. On the other hand, if the digital watermarks are not detectable from the scanned image d34 in step S13, the printed matter is determined to be counterfeit (a copy) in the determination using the digital watermark.

As a result, the printed matter is determined to be genuine, only if the printed matter is determined to be genuine in the determination using the latent image (step S11) and if the printed matter is determined to be genuine in the determination using the digital watermark (step S13).

Next is a description of another example of a printed matter authenticity determination method according to the embodiment of the present invention. In this example, a printed matter authenticity determination apparatus 30 is used to determine the authenticity of a printed matter.

Figure 11:
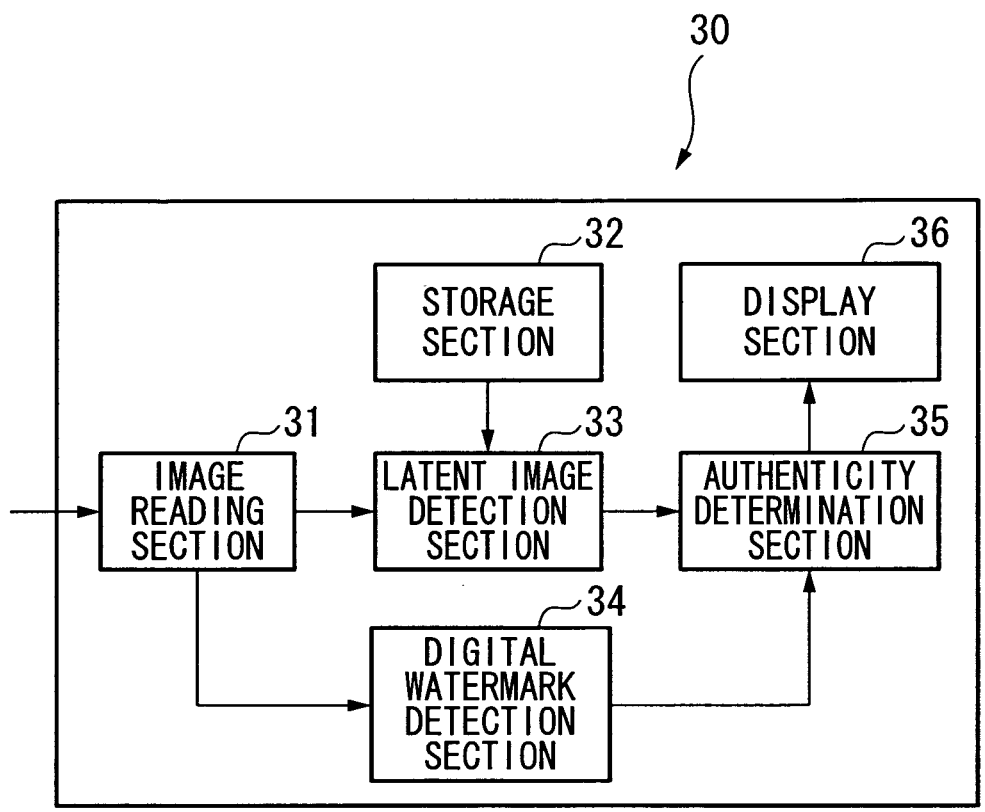
FIG. 11 shows one example of a configuration of a printed matter authenticity determination apparatus 30 according to the embodiment.

FIG. 11 shows one example of a configuration of a printed matter authenticity determination apparatus 30 according to the embodiment of the present invention. The printed matter authenticity determination apparatus 30 includes: an image reading section 31; a storage section 32; a latent image detection section 33; a digital watermark detection section 34; an authenticity determination section 35; and a display section 36.

The image reading section 31 is a device such as a scanner. The image reading section 31 reads as an image a pattern or the like printed on a printed matter, to thereby generate a scanned image that is electronic image data of the printed matter. The image reading section 31 outputs the generated scanned image to the latent image detection section 33 and to the digital watermark detection section 34. The storage section 32 stores: electronic image data of the line filter; and electronic image data of the latent image of the printed matter. The latent image detection section 33 superimposes the electronic image data of the line filter stored in the storage section 32 on the scanned image that is output from the image reading section 31, to thereby determine whether the latent image stored in the storage section 32 is detectable or not. The latent image detection section 33 then outputs the determination result to the authenticity determination section 35.

The digital watermark detection section 34 determines whether the digital watermarks are detectable from the scanned image that is output from the image reading section 31 or not, and outputs the determination result to the authenticity determination section 35.

Based on the determination result that is output from the latent image detection section 33 and on the determination result that is output from the digital watermark detection section 34, the authenticity determination section 35 determines whether the printed matter scanned by the image reading section 31 is genuine or not. To be more specific, if the determination result that is output from the latent image detection section 33 shows that the latent image is detectable from the scanned image, and if the determination result that is output from the digital watermark detection section 34 shows that the digital watermarks are detectable from the scanned image, the authenticity determination section 35 determines that the printed matter is genuine, and outputs the determination result to the display section 36.

The display section 26 is a display device such as an LCD (Liquid Crystal Display). The display section 26 displays a determination result that is output from the authenticity determination section 35 on the screen. That is, the display section 26 displays whether the printed matter is genuine or counterfeit on the screen.

Figure 12:
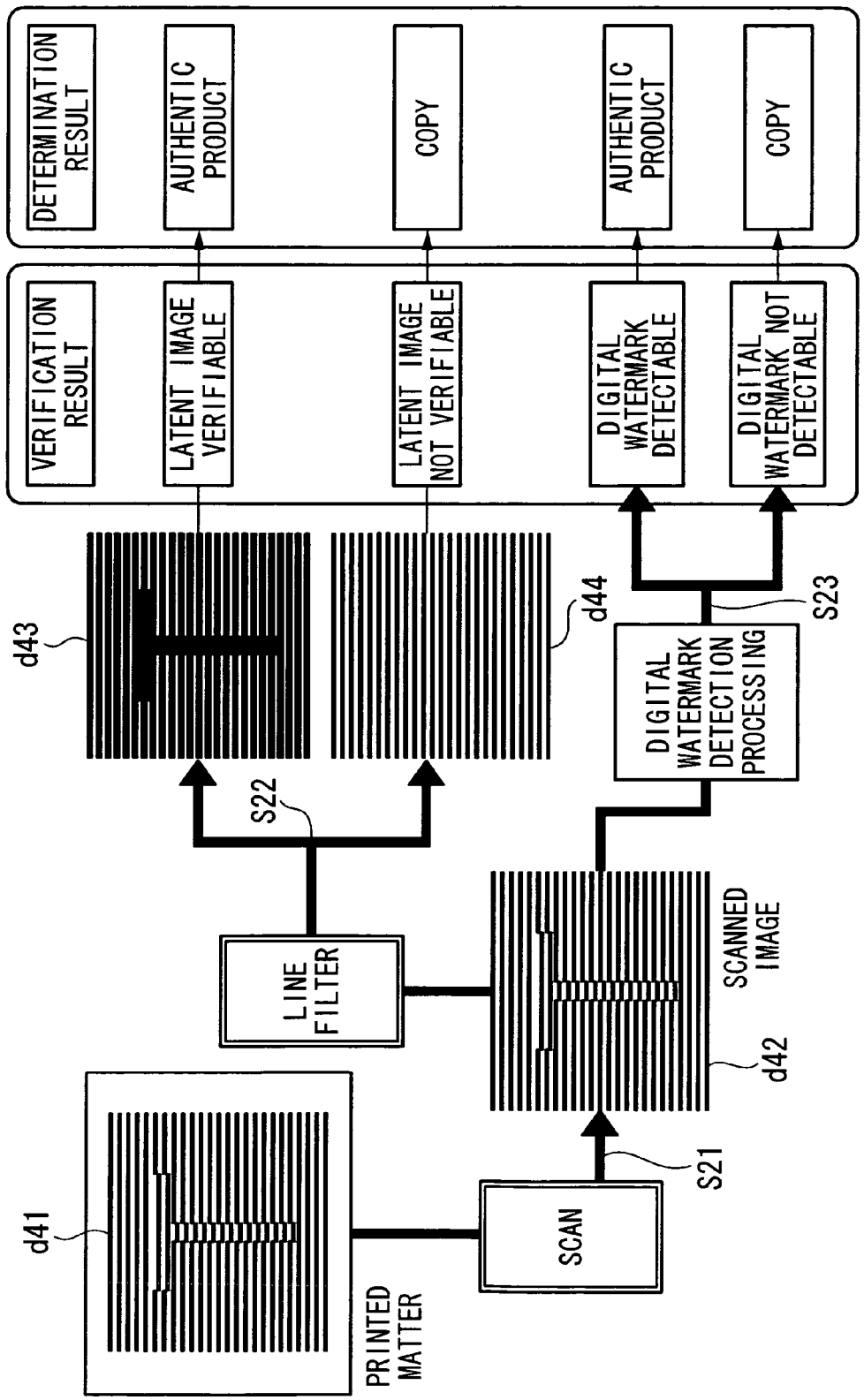
FIG. 12 is one example of processing of the printed matter authenticity determination apparatus 30 according to the embodiment.

FIG. 12 shows one example of processing of the printed matter authenticity determination apparatus 30 according to the embodiment of the present invention. First, the image reading section 31 reads a printed matter d41 to generate a scanned image d42 (step S21). Then, the electronic image data of the line filter stored in the storage section 32 is superimposed on the scanned image d42, to thereby determine whether the same latent image as that stored in the storage section 32 is detectable or not (step S22). If the latent image is verifiable in step S22 (d43), the printed matter is determined to be genuine (an authentic product) in the determination using the latent image. On the other hand, if the latent image is not verifiable in step S22 (d44), the printed matter is determined to be counterfeit (a copy) in the determination using the latent image.

Furthermore, the digital watermark detection section 34 determines whether the digital watermarks are detectable from the scanned image d42 generated in step S21 or not (step S23). If the digital watermarks are detectable from the scanned image d42 in step S23, the printed matter is determined to be genuine in the determination using the digital watermark. On the other hand, if the digital watermarks are not detectable from the scanned image d42 in step S23, the printed matter is determined to be counterfeit in the determination using the digital watermark.

As a result, the printed matter is determined to be genuine, only if the printed matter is determined to be genuine in the determination using the latent image (step S22) and if the printed matter is determined to be genuine in the determination using the digital watermark (step S23).

Utilization of the printed matter authenticity determination methods described in FIG. 10 to FIG. 12 makes it possible to determine whether a printed matter is genuine or counterfeit by means of the latent image printed on the printed matter and the digital watermarks embedded in the printed matter. Therefore, it is possible to effectively prevent forgery and duplication of a printed matter. For example, even in the case where a printer or others have used a microscope or the like to minutely analyze the pattern or the like printed on the printed matter and have duplicated the latent image, it is difficult to find that digital watermarks are embedded in the printed matter. This improves the accuracy of the determination of whether a printed matter is genuine or counterfeit.

In the embodiment described above, a program for implementing the functions or a part of the functions of: the latent image generation section 11, the bitmap image generation section 12, the bitmap image processing section 13, the image merging section 14, and the printing section 15 of FIG. 4; the latent image generation section 21, the latent image processing section 22, the bitmap image generation section 23, the image merging section 24, and the printing section 25 of FIG. 6; the image reading section 31, the storage section 32, the latent image detection section 33, the digital watermark detection section 34, the authenticity determination section 35, and the display section 36 of FIG. 11 may be recorded in a computer-readable recording medium, and a computer system may be allowed to read and execute the program recorded in this recording medium to control the image processing apparatus 10a, the image processing apparatus 10b, and the printed matter authenticity determination apparatus 30. Note that the term "computer system" here includes an OS and hardware such as peripheral equipment.

Furthermore, the term "computer-readable recording medium" denotes a portable medium such as a flexible disk, a magneto-optical disk, a ROM, and a CD-ROM, and a storage device such as a hard disk drive built into the computer system. In addition, the term "computer-readable recording medium" also includes: one which dynamically retains a program for a short period of time like a communication wire when a program is transmitted via a network such as the Internet or via a communications line such as a telephone line; and one which, in the former case, retains a program for a certain period of time like a volatile memory inside the computer system serving as a server or a client. In addition, the above-mentioned program may be for implementing a part of the above-mentioned functions. Moreover, it may be one that can implement the above-mentioned functions in combination with a program already recorded in the computer system.

While the embodiment of the invention has been described in detail with reference to the drawings, specific configurations are not limited to the embodiment. Designs and the like without departing from the spirit or scope of the invention are included in the invention.

Industrial Applicability

It is possible to provide: a printed matter effective in prevention of or safeguard against forgery or duplication; an image processing apparatus, an image processing method, and a program that are favorable for obtaining the printed matter; and an authenticity determination apparatus and an authenticity determination method that are favorable for determining the authenticity of the printed matter.

The invention claimed is:

1. An image processing apparatus, comprising:
   a latent image generation device that generates electronic image data of a line latent image, the line latent image becoming visible when a line filter provided with a line pattern formed on a transparent film is superimposed thereon;
   a digital watermark generation device that generates electronic image data of digital watermarks to set an embedding intensity of the digital watermarks so that
      an upper limit and a lower limit of the embedding intensity of the digital watermarks are set so that the number of detections of the digital watermarks embedded in the printed matter is not less than a predetermined number, and
      a difference between the number of detections of the digital watermarks in an original and the number of detections of the digital watermarks in a copy of the printed matter is not less than a predetermined value; and
   an image merging device that merges, in a predetermined region, electronic image data of the line latent image generated by the latent image generation device with the electronic image data generated by the digital watermarks to generate merged electronic image data such that a superimposed area between the line latent images and the digital watermarks is smaller than a predetermined value and the increment of an area in which the line latent images and the digital watermarks are printed with respect to the area in which the line latent images are printed is less than a predetermined ratio.

2. An image processing method, comprising:
   a first process of generating electronic image data of a line latent image, the line latent image becoming visible when a line filter provided with a line pattern formed on a transparent film is superimposed thereon;
   a second process of generating electronic image data of digital watermarks to set an embedding intensity of the digital watermarks so that
      an upper limit and a lower limit of the embedding intensity of the digital watermarks are set so that the number of detections of the digital watermarks embedded in the printed matter is not less than a predetermined number, and
      a difference between the number of detections of the digital watermarks in an original and the number of detections of the digital watermarks in a copy of the printed matter is not less than a predetermined value; and
   a third process of causing electronic image data of the line latent image generated in the first process to overlap, in a predetermined region, the electronic image data generated in the second process, to thereby generate merged electronic image data such that a superimposed area between the line latent images and the digital watermarks is smaller than a predetermined value and the increment of an area in which the line latent images and the digital watermarks are printed with respect to the area in which the line latent images are printed is less than a predetermined ratio.

3. The image processing method according to claim 2, wherein
   the electronic image data of the line latent image is in a vector image format;
   the electronic image data of the digital watermarks is in a bitmap image format; and
   in the third process, the electronic image data of the line latent image is transformed from a vector image format into a bitmap image format, and then is superimposed on the electronic image data of the digital watermarks, to thereby generate the merged electronic image data.

4. The image processing method according to claim 2, wherein
   the electronic image data of the line latent image is in a vector image format;
   the electronic image data of the digital watermarks is in a bitmap image format; and
   in the third process, the electronic image data of the digital watermarks is transformed from a bitmap image format into a vector image format, and then is superimposed on the electronic image data of the line latent image, to thereby generate the merged electronic image data.

5. A non-transitory computer-readable recording medium including a program that allows a computer to execute:
   latent image generation processing that generates electronic image data of a line latent image, the line latent image becoming visible when a line filter provided with a line pattern formed on a transparent film is superimposed thereon;
   digital watermarks generation processing that generates electronic image data of a digital watermark to set an embedding intensity of the digital watermarks so that
      an upper limit and a lower limit of the embedding intensity of the digital watermarks are set so that the number of detections of the digital watermarks embedded in the printed matter is not less than a predetermined number, and
      a difference between the number of detections of the digital watermarks in an original and the number of detections of the digital watermarks in a copy of the printed matter is not less than a predetermined value; and
   image merging processing that causes the electronic image data of the line latent image generated in the latent image generation processing to overlap, in a predetermined region, the electronic image data of the digital watermarks generated in the digital watermark generation processing, to thereby generate merged electronic image data such that a superimposed area between the line latent images and the digital watermarks is smaller than a predetermined value and the increment of an area in which the line latent images and the digital watermarks are printed with respect to the area in which the line latent images are printed is less than a predetermined ratio.

* * * * *